United States Patent Office 3,018,197
Patented Jan. 23, 1962

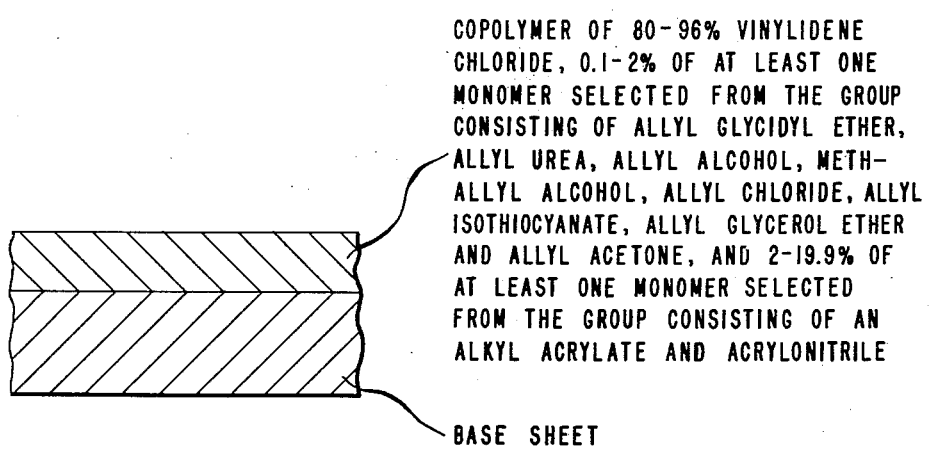

3,018,197
PACKAGING FILM AND PROCESS FOR PREPARATION THEREOF
Edward Royals Covington and John Warren Meier, Madison, Tenn., assignors to E. I. du Pont de Nemours and Company, Wilmington, Del., a corporation of Delaware
Filed July 23, 1957, Ser. No. 673,581
20 Claims. (Cl. 117—145)

This invention relates to coating compositions and particularly to coating compositions used to improve the properties of packaging materials.

The necessity of coating regenerated cellulose film, cellulose acetate film, paper and the like to convert them into commercially acceptable packaging materials is well known. The coatings can make the material capable of adhering to itself by the application of heat, termed "heat sealing" by the art, so that the conversion to bags, containers, etc., is facilitated. The coatings can provide moistureproofness, a property usually lacking in the base material. The coatings can impart printability to a surface that otherwise might display little ability to retain printing inks. The coatings can serve to improve the stress-flex property of the base material, a property indicating the ability of the ultimate packaging material to withstand abuse during handling in the wrapping and shipping operations. However, no matter which surface property or properties the coating composition serves to improve, it is important that the composition adhere tenaciously to the base material and that the composition does not affect adversely the desirable properties such as strength, durability or transparency of the base material.

One of the most useful group of compositions which fulfill the above requirements are the vinylidene chloride copolymers. However, the level of properties, particularly heat-seal strength, obtained by the use of the vinylidene chloride copolymer compositions heretofore known to the art leave much room for improvement. The adhesion of these prior art compositions has also left something to be desired.

It is an object of the present invention to provide a vinylidene chloride copolymer coating composition which produces substantial improvements in the level of packaging film properties. It is a further object to provide such a coating composition which will adhere to and improve the properties of a variety of base materials ranging from thermoplastic polymeric materials (polyesters such as polyethylene terephthalate film) to the cellulosic materials (regenerated cellulose film), thus providing new and useful packaging materials. A still further object is to specify a process for preparing the new packaging films. Other objects will appear hereinafter.

The objects are accomplished by providing a base film having at least one surface coated with a coating composition comprising essentially a copolymer obtained from 80–96% vinylidene chloride, 2–19.9% of at least one other polymerizable mono-olefinic monomer copolymerizable therewith, preferably selected from the group consisting of an alkyl acrylate and acrylonitrile, and 0.1–2.0% of at least one polymerizable monomer containing an allyl grouping, preferably selected from the group consisting of allyl glycidyl ether, allyl urea, allyl alcohol, methallyl alcohol, allyl chloride, allyl isothiocyanate, allyl glycerol ether and allyl acetone. The accompanying drawing illustrates in a cross-sectional view the novel coated film of this invention.

Preferably, the coating composition comprises a copolymer obtained from 92–96% vinylidene chloride, 4–7.9% of at least one other polymerizable mono-olefinic monomer copolymerizable therewith selected from the group consisting of acrylonitrile and alkyl acrylate, 0.1–2% of an allyl-containing monomer selected from the group consisting of allyl glycidyl ether and methallyl alcohol and up to 1.6%, based on the combined weight of the previous components, of an unsaturated aliphatic acid selected from the group consisting of acrylic acid, methacrylic acid and itaconic acid.

The invention will be more clearly understood by referring to the descriptive material and the examples which follow. Unless otherwise stated, all parts and percentages given in the examples are by weight. The examples, although illustrating specific embodiments of the present invention, should not be considered limitative.

For convenience, abbreviations will be used in the tables associated with the examples. $VCl_2$ represents vinylidene chloride; MA, methyl acrylate; AGE, allyl glycidyl ether; MAA, methacrylic acid; MAAL, methallyl alcohol; and AN, acrylonitrile.

EXAMPLE I

The coating composition was prepared by adding a dispersing agent, vinylidene chloride, methyl acrylate, acrylonitrile, allyl glycidyl ether, methacrylic acid and water to a vessel fitted with a reflux condenser. The dispersing agent was composed of equal amounts of "Duponol" WAQ,[1] "Duponol" LSP,[2] and "Sulframin" ABN.[3] After stirring this mixture to disperse the ingredients, a solution of ammonium persulfate and meta-sodium bisulfite in water was added to catalyze the reaction. The mixture refluxed maintaining the temperature between 32° C. and 36° C. as polymerization progressed. The mixture was stirred until refluxing ceased, thereby indicating the completion of copolymerization. Upon completion of the reaction, a solution of "Duponol" WAQ and "Daxad" 11[4] was added to stabilize the copolymer against coagulation. The resulting dispersion was cooled and discharged through a filter. The polymeric dispersion was composed of 50% solids. The ingredients used in the preparation are summarized below:

| | Parts | Parts |
|---|---|---|
| Dispersing agent: | | |
| "Duponol" WAQ | 0.66 | |
| "Duponol" LSP | 0.66 | |
| "Sulframin" ABN | 0.66 | |
| | | 2 |
| Vinylidene chloride | | 96 |
| Methyl acrylate | | 2 |
| Arcylonitrile | | 2 |
| Allyl glycidyl ether | | 1 |
| Methacrylic acid | | 1 |
| Catalyzing agent: | Parts | |
| Ammonium persulfate | 0.4 | |
| Meta-sodium bisulfite | 0.2 | |
| | | 0.6 |
| Stabilizing agent: | | |
| "Duponol" WAQ | 1.0 | |
| "Daxad" 11 | 0.3 | |
| "Sulframin" ABN | 2.0 | |
| | | 3.3 |
| Water | | 108 |

The dispersion was then coated on a regenerated cellulose film approximately 0.001" thick. The coating was applied by passing the film through a coating bath containing the dispersion. Excess dispersion was doctored from the film surface. The coated film was then dried and tested. It had a coating weight, as dried of 5.5 grams/square meter.

As a control, the regenerated cellulose film was coated in a similar manner with a composition containing all

[1] Sodium lauryl sulfate.
[2] Sodium oleyl sulfate.
[3] Sodium dodecyl benzene sulfonate.
[4] Sodium salt of naphthalene sulfonic acid condensed with formaldehyde.

of the above ingredients except that the allyl glycidyl ether was omitted. The coating weight was 6.4 grams/square meter.

In the following table, Table 1, the properties of the two films are compared:

Table 1

| Film | Coating Composition | Percent by weight |
|---|---|---|
| Ex. I | VCl₂/MA/AN/MAA/AGE | 95/2/2/1/1 |
| Control | VCl₂/MA/AN/MAA | 96/2/2/1 |

| Film | Heat-seal strength (gms./1.5 in.) | Stress-flex | Anchorage |
|---|---|---|---|
| Ex. I | 483 | 107 | 1 |
| Control | 0 | .94 | 3 |

The details of the methods for testing the films follow:

*Coating weight* is determined by soaking the coated film in a hot solution of a sodium alkyl aryl sulfonate in acetic acid and stripping the coating from the film. The stripped coating in the form of a thin film is dried and weighed.

*Heat-seal strength* is measured by cutting a piece of the coated film 4" x 10" with the grain running in the long or machine direction into two pieces 4" x 5" each. The two pieces are superimposed so that opposite surfaces are in contact. The two pieces of superimposed film are then sealed together at each end at right angles to the grain. A ¾" wide sealing bar heated to a temperature of 125° C. at 20 p.s.i. pressure contacts the ends for ¼ second. The sealed sheets are then cut in half at right angles to the grain. From the center of the two resulting pieces, 1½" wide strips parallel to the grain are cut. The resulting four sets of strips are tested by opening each set at the free ends, placing them in a Suter testing machine and pulling them apart. The highest force in grams required to pull the strips apart is taken as a measure of the heat-seal bond strength.

*Stress-flex* is a measure of the flexibility and durability of the film. A sample of film 4" x 7" is placed between two rubber-faced clamps 1" apart. One clamp is stationary, the other slides back and forth by gravity on two rods flexing the film as the whole assembly rotates, until the film sample breaks. The stress-flex value indicates the number of strokes of the movable clamp until the film sample breaks.

*Anchorage* refers to the adhesion of the coating to the base film when in direct contact with water. Samples of coated film are suspended in water at 45° C. for 16 hours and then graded approximately as follows:

Grade 1 _____ No blisters.
Grade 2 _____ Few blisters.
Grade 3 _____ Decided blistering.
Grade 4 _____ Coating sloughs off at blistered or unblistered portions.

EXAMPLE II

A coating composition was prepared as in Example I using the monomers shown in Table 2 and a regenerated cellulose film was coated in a manner similar to that described in Example I using the same quantities of dispersing and stabilizing agents. The coating weight was 5.5 grams/square meter.

As a control, the regenerated cellulose film was coated in an identical manner from a composition prepared without allyl glycidyl ether to a coating weight of 5.84 grams/square meter. The polymer compositions and the properties of both coated films are presented in the following table, Table 2:

Table 2

| Film | Coating Composition | Percent by weight |
|---|---|---|
| Ex. II | VCl₂/MA/AN/MAA/AGE | 93/5/1/1/1 |
| Control | VCl₂/MA/AN/MAA | 94/5/1/1 |

| Film | Heat-seal strength (gms./1.5 in.) | Stress-flex | Anchorage |
|---|---|---|---|
| Ex. II | 250 | 47 | 1 |
| Control | 0 | 13 | 3 |

EXAMPLE III

A coating composition was prepared using the monomers shown in Table 3 and a regenerated cellulose film was coated in a manner similar to that described in Example I using the same quantities of dispersing and stabilizing agents. The coating weight was 5.5 grams/square meter.

As a control, the regenerated cellulose film was coated in an identical manner from a composition prepared without allyl glycidyl ether to a coating weight of 4.93 grams/square meter. The polymer compositions and the properties of both coated films are presented in the following table, Table 3:

Table 3

| Film | Coating Composition | Percent by weight |
|---|---|---|
| Ex. III | VCl₂/MA/MAA/AGE | 93/6/1/1 |
| Control | VCl₂/MA/MAA | 94/6/1 |

| Film | Heat-seal strength (gms./1.5 in.) | Stress-flex | Anchorage |
|---|---|---|---|
| Ex. III | 318 | 38 | 1 |
| Control | 0 | 26 | 2 |

EXAMPLE IV

A coating composition was prepared using the monomers shown in Table 4 and a regenerated cellulose film was coated in a manner similar to that described in Example I using the same quantities of dispersing and stabilizing agents. The coating weight was 5.2 grams/square meter.

As a control, regenerated cellulose film was coated with a composition prepared in an identical manner except that allyl glycidyl ether was omitted. The coating weight was 6.2 grams/square meter. The polymer compositions and the properties of both coated films are presented in the following table, Table 4:

Table 4

| Film | Coating Composition | Percent by weight |
|---|---|---|
| Ex. IV | VCl₂/MA/AN/MAA/AGE | 93/2/4/1/1 |
| Control | VCl₂/MA/AN/MAA | 94/2/4/1 |

| Film | Heat-seal strength (gms./1.5 in.) | Stress-flex | Anchorage |
|---|---|---|---|
| Ex. IV | 266 | 45 | 2 |
| Control | 0 | 35 | 3 |

EXAMPLE V

A coating composition was prepared using the monomers shown in Table 5 and a regenerated cellulose film was coated in a manner similar to that described in Example I using the same quantities of dispersing and stabilizing agents. The coating weight was 5.6 grams/square meter.

As a control, regenerated cellulose film was coated with a composition prepared in an identical manner except that allyl glycidyl ether was omitted. The coating weight was 6.2 grams/square meter. The polymer compositions and the properties of both coated films are presented in the following table, Table 5:

*Table 5*

| Film | Coating Composition | Percent by weight |
|---|---|---|
| Ex. V | VCl₂/AN/MAA/AGE | 93/6/1/1 |
| Control | VCl₂/AN/MAA | 94/6/1 |

| Film | Heat-seal strength (gms./1.5 in.) | Anchorage |
|---|---|---|
| Ex. V | 296 | 1 |
| Control | 46 | 3 |

EXAMPLES VI-IX

These examples define the preferred limits for the percentage of allyl glycidyl ether to be used in preparing the polymeric coating. A substantial improvement in properties, particularly heat-seal strength and anchorage, is apparent with as little as 0.1 part of allyl glycidyl ether in the polymer.

Coating compositions were prepared using the monomers in the ratio shown in Table 6 and regenerated cellulose film was coated in a manner similar to that described in Example I using the same quantities of dispersing and stabilizing agents in Example VIII and the control as in Example I. In Examples VI, VII and IX, 0.66 part of "Daxad" 11 was substituted for 0.66 part of "Duponol" LSP in the dispersing agent.

As a control, the film was coated with a composition prepared in an identical manner except that allyl glycidyl ether was omitted. The polymer compositions, the coating weights, and the properties of the coated films are presented in the following table, Table 6:

*Table 6*

| Film | Coating composition | Ratio of monomers therein | Coating wt. (gms./sq. met.) |
|---|---|---|---|
| Ex. VI | VCl₂/MA/AN/MAA/AGE | 94/3/3/1/0.1 | 7.09 |
| Ex. VII | VCl₂/MA/AN/MAA/AGE | 94/3/3/1/0.5 | 6.77 |
| Ex. VIII | VCl₂/MA/AN/MAA/AGE | 94/3/3/1/1 | 5.10 |
| Ex. IX | VCl₂/MA/AN/MAA/AGE | 94/3/3/1/2 | 7.38 |
| Control | VCl₂/MA/AN/MAA | 94/3/3/1 | 4.65 |

| Film | Heat-seal strength (gms./1.5 in.) | Stress-flex | Anchorage |
|---|---|---|---|
| Ex. VI | 320 | 32 | 1 |
| Ex. VII | 435 | 52 | 1 |
| Ex. VIII | 278 | 37 | 1 |
| Ex. IX | 439 | 30 | 1 |
| Control | 10 | 28 | 3 |

EXAMPLE X

This example, besides showing the effect of the allyl-containing monomer in the polymer on the heat-seal strength and the flexibility of the ultimate film, shows the desirability of including the unsaturated aliphatic acid in the preparation of the polymeric coating particularly to secure improved anchorage and the applicability of the invention to regenerated cellulose film that had been pretreated with a guanidine-urea-formaldehyde resin.

A coating composition was prepared using the monomers in the ratio shown in Table 6 and a regenerated cellulose film was coated in a manner similar to that described in Example I with a minor change in the dispersing agent. The dispersing agent consisted of 1 part of "Duponol" WAQ. The stabilizing agent consisted of 1 part "Duponol" WAQ, 2 parts "Sulframin" ABN and 0.3 part of "Daxad" 11. The regenerated cellulose film had been pretreated to contain 0.45% of a guanidine-urea-formaldehyde resin obtained by the reaction of guanidine nitrate, urea and formaldehyde as described in Example I of United States Patent No. 2,533,557 to Chapman.

As controls, the pretreated film was coated with a composition prepared in an identical manner except that allyl glycidyl ether was omitted in control A and in control B, allyl glycidyl ether and methacrylic acid were both omitted. The polymer compositions, the coating weights and the properties of the coated films are presented in the following table, Table 7:

*Table 7*

| Film | Coating composition | Ratio of monomers therein | Coating wt. (gms./sq. met.) |
|---|---|---|---|
| Ex. X | VCl₂/MA/AN/MAA/AGE | 94/3/3/1/1 | 5.8 |
| Control A | VCl₂/MA/AN/MAA | 94/3/3/1 | 6.4 |
| Control B | VCl₂/MA/AN | 94/3/3 | 6.5 |

| Film | Heat-seal strength (gms./1.5 in.) | Stress-flex | Anchorage |
|---|---|---|---|
| Ex. X | 225 | 58 | 1 |
| Control A | 25 | 41 | 1 |
| Control B | 45 | 38 | 2 |

EXAMPLE XI

A coating composition was prepared using the monomers shown in Table 8 and a regenerated cellulose film was coated in a manner similar to that described in Example I using the same quantities of dispersing and stabilizing agents. The coating weight was 4.9 grams/square meter.

As a control, the film was coated with a composition prepared in an identical manner except that allyl glycidyl ether was omitted. The coating weight was 5.5 grams/square meter. The polymer compositions and the properties of the coated films are presented in the following table, Table 8:

*Table 8*

| Film | Coating composition | Percent by weight |
|---|---|---|
| Ex. XI | VCl₂/MA/AN/AGE | 92/3/3/2 |
| Control | VCl₂/MA/AN | 94/3/3 |

| Film | Heat-seal strength (gms./1.5 in.) | Stress-flex | Anchorage |
|---|---|---|---|
| Ex. XI | 312 | 36 | 1 |
| Control | 55 | 26 | 1 |

EXAMPLE XII

A coating composition was prepared using the monomers shown in Table 9. It will be noted that methallyl alcohol was used as the allyl-containing compound in preparing the polymeric coating. A regenerated cellulose film was coated in a manner similar to that described in Example I using the same quantities of dispersing and stabilizing agents. The coating weight was 4.4 grams/square meter.

As a control, the film was coated with a composition prepared in an identical manner except that methallyl alcohol was omitted. The coating weight was 7.69 grams/square meter. The polymer compositions and the properties of the coated films are presented in the following table, Table 9:

Table 9

| Film | Coating composition | Percent by weight |
|---|---|---|
| Ex. XII | VCl₂/MA/AN/MAA/MAAL | 93/3/3/1/1 |
| Control | VCl₂/MA/AN/MAA | 94/3/3/1 |

| Film | Heat-seal strength (gms./1.5 in.) | Stress-flex | Anchorage |
|---|---|---|---|
| Ex. XII | 263 | 29 | 1 |
| Control | 0 | 22 | 1 |

EXAMPLE XIII

A coating composition was prepared using the monomers shown in Table 9 and glassine paper 0.0012" thick was coated in a manner similar to that described in Example I using the same quantities of dispersing and stabilizing agents as in Example I. The coating weight was 8.0 grams/square meter.

The polymeric coating composition and the properties of the coated film are presented in the following table, Table 10:

Table 10

| Film | Coating composition | Percent by weight |
|---|---|---|
| Ex. XIII | VCl₂/MA/AN/MAA/AGE | 93/3/3/1/1 |

| Film | Heat-seal strength (gms./1.5 in.) | Anchorage |
|---|---|---|
| Ex. XIII | 337 | 1 |

From the foregoing examples it is evident that a wide variety of ingredients may enter the preparation of the films. To obtain increased anchorage at high relative humidities, films sensitive to water vapor may be pretreated with anchoring resins, such as those disclosed in U.S. Patents 2,159,007; 2,280,829; 2,432,542; 2,533,557 and 2,546,575. The films, particularly regenerated cellulose film, may contain softeners or other constituents such as pigments, dyes, delusterants, plasticizers, etc., if desired. The important concept here and the one basic to this invention resides in the use of a critical coating comprising a copolymer obtained from 80–96% by weight of vinylidene chloride, 2–19.9% by weight of a polymerizable monomer and 0.1–2.0% by weight of an allyl-containing monomer.

As polymerizable monomers for use with the vinylidene chloride and the allyl-containing monomers in the coating, we have illustrated the use of methyl acrylate and acrylonitrile. However, the invention is not limited to these. Any of the following may be used: methyl, ethyl, isobutyl, butyl, octyl and 2-ethylhexyl acrylates and methacrylates; phenyl methacrylate, cyclohexyl methacrylate, p-cyclohexylphenyl methacrylate, methoxyethyl methacrylate, glycidyl methacrylate, chloroethyl methacrylate, 2-nitro-2-methyl-propyl methacrylate, and the corresponding esters of acrylic acid; methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, methylene diethyl malonate, isopropenyl acetate, acrylamide, methacrylamide or mono-alkyl substitution products thereof, phenyl vinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride and unsaturated aliphatic ethers described in U.S. Patent 2,160,943. These compounds may be described as vinyl or vinylidene compounds having a single $CH_2=C<$ group. The most useful ones fall within the general formula $$CH_2=C\begin{matrix}R\\X\end{matrix}$$

where R may be hydrogen, a halogen or a saturated aliphatic radical and X is selected from one of the following groups:

$-Cl, -Br, -F, -CN, -C_6H_5, -COH,$ $$-C\begin{matrix}\parallel O\\OR'\end{matrix}, -C\begin{matrix}\parallel O\\R'\end{matrix}, -C\begin{matrix}\parallel O\\H\end{matrix},$$

$-OC_6H_5, -CONH_2, -CONH-R',$ and $-CONR_2'$ in which R' is alkyl.

The coatings may be applied in the form of aqueous dispersions as in the examples or from solutions of the polymers in organic solvents. Unsaturated aliphatic acids such as itaconic acid, acrylic acid and methacrylic acid are advantageously added to the coating compositions in either aqueous dispersions or organic solutions. However, the acids may be omitted from these compositions with little deleterious effect. It should be pointed out that films coated with compositions that do not include the unsaturated acid are inferior in anchorage and adhesion. For this reason, it is preferred to include an unsaturated acid in the coating compositions.

The coatings may be applied in accordance with any known coating techniques. They may be applied by passing the film through baths in a continuous manner or in a batch manner. Coatings may also be sprayed onto the film, or applied manually by brushing or the like. The thickness of the coatings may be adjusted in accordance with methods well known in the coating art.

The preferred base material for use in this invention is regenerated cellulose film. Other base materials which may be used in the invention include paper, films of cellulose acetate, cellulose propionate, cellulose acetatebutyrate, ethyl cellulose, hydroxyethyl cellulose, hydroxypropyl cellulose, carboxymethyl cellulose, the polyesters such as polyethylene terephthalate, etc.

The materials of this invention are used advantageously as packaging materials for foods, cigarettes and the like. They provide flexible, strong materials that, due to improved heat-seal strength, durability and flexibility, can be easily converted to packages. This coating does not detract from the transparency of the base material and surprisingly, provides excellent non-fogging characteristics. Because of these superior properties the present films are outstanding as a vacuum and pressure packaging material, e.g., for packaging of luncheon meats, cheese, nuts, etc.

As many widely different embodiments can be made without departing from the scope of our invention, it is understood that the invention is not limited except as defined in the appended claims.

Having fully disclosed our invention, we claim:

1. A packaging material comprising a base sheet having at least one surface coated with a composition comprising essentially a copolymer obtained from 80–96% by weight of vinylidene chloride, 0.1–2.0% by weight of at least one polymerizable monomer containing an allyl grouping selected from the group consisting of allyl glycidyl ether, allyl urea, allyl alcohol, methallyl alcohol, allyl chloride, allyl isothiocyanate, allyl glycerol ether and allyl acetone and 2–19.9% by weight of at least one other polymerizable mono-olefinic monomer copolymerizable with vinylidene chloride selected from the group consisting of an alkyl acrylate and acrylonitrile.

2. A packaging material as in claim 1 wherein the base sheet is a film of regenerated cellulose.

3. A packaging material as in claim 1 wherein the polymerizable mono-olefinic monomer is acrylonitrile.

4. A packaging material as in claim 1 wherein the polymerizable mono-olefinic monomer is methyl acrylate.

5. A packaging material as in claim 1 wherein the polymerizable monomer containing an allyl grouping is allyl glycidyl ether.

6. A packaging material as in claim 1 wherein the polymerizable monomer containing an allyl grouping is methallyl alcohol.

7. A packaging material comprising a base sheet having at least one surface coated wtih a composition comprising essentially a copolymer obtained from 92–96% by weight of vinylidene chloride, 0.1–2% by weight of at least one polymerizable monomer containing an allyl grouping selected from the group consisting of allyl glycidyl ether, allyl urea, allyl alcohol, methallyl alcohol, allyl chloride, allyl isothiocyanate, allyl glycerol ether and allyl acetone, 4–7.9% parts by weight of at least one other polymerizable mono-olefinic monomer copolymerizable with vinylidene chloride selected from the group consisting of an alkyl acrylate and acrylonitrile and up to 1.6%, based on the weight of the previous components, of an unsaturated aliphatic acid selected from the group consisting of acrylic acid, methacrylic acid and itaconic acid.

8. A packaging material as in claim 7 wherein the base sheet is a film of regenerated cellulose.

9. A packaging material as in claim 7 wherein the polymerizable mono-olefinic monomer is acrylonitrile.

10. A packaging material as in claim 7 wherein the polymerizable mono-olefinic monomer is methyl acrylate.

11. A packaging material as in claim 7 wherein the polymerizable monomer containing an allyl grouping is allyl glycidyl ether.

12. A packaging material as in claim 7 wherein the polymerizable monomer containing an allyl grouping is methallyl alcohol.

13. A packaging material comprising a regenerated cellulose film having at least one surface coated with a composition comprising essentially a copolymer obtained from 80–96% by weight of vinylidene chloride, 0.1–2% by weight of allyl glycidyl ether and 2–19.9% by weight of methyl acrylate.

14. A packaging material comprising a regenerated cellulose film having at least one surface coated with a composition comprising essentially a copolymer obtained from 92–96% by weight of vinylidene chloride, 0.1–2% by weight of allyl glycidyl ether, 4–7.9% by weight of methyl acrylate and up to 1.6%, based on the combined weight of the previous components, of an unsaturated aliphatic acid selected from the group consisting of acrylic acid, methacrylic acid and itaconic acid.

15. A process for preparing a packaging film which comprises coating a regenerated cellulose film with an aqueous dispersion containing a copolymer obtained from 80–96% by weight of vinylidene chloride, 0.1–2% by weight of allyl glycidyl ether and 2–19.9% by weight of methyl acrylate; and drying the coated film.

16. A process for preparing a packaging film which comprises coating a regenerated cellulose film with an aqueous dispersion containing a copolymer obtained from 92–96% by weight of vinylidene chloride, 0.1–2% by weight of allyl glycidyl ether, 4–7.9% by weight of methyl acrylate and up to 1.6%, based on the combined weight of the previous components, of an unsaturated aliphatic acid selected from the group consisting of acrylic acid, methacrylic acid and itaconic acid; and drying the coated film.

17. A process for preparing a packaging film which comprises coating a base sheet with an aqueous dispersion containing a copolymer obtained from 80–96% by weight of vinylidene chloride, 0.1–2.0% by weight of at least one polymerizable monomer containing an allyl grouping selected from the group consisting of allyl glycidyl ether, allyl urea, allyl alcohol, methallyl alcohol, allyl chloride, allyl isothiocyanate, allyl glycerol ether and allyl acetone and 2–19.9% by weight of at least one other polymerizable mono-olefinic monomer copolymerizable with vinylidene chloride selected from the group consisting of an alkyl acrylate and acrylonitrile; and drying said coated film.

18. A process as in claim 17 wherein the base sheet is a film of regenerated cellulose.

19. A process for preparing a packaging film which comprises coating a base sheet with an aqueous dispersion containing a copolymer obtained from 92–96% by weight of vinylidene chloride, 0.1–2% by weight of at least one polymerizable monomer containing an allyl grouping selected from the group consisting of allyl glycidyl ether, allyl urea, allyl alcohol, methallyl alcohol, allyl chloride, allyl isothiocyanate, allyl glycerol ether and allyl acetone, 4–7.9% by weight of at least one other polymerizable mono-olefinic monomer copolymerizable with vinylidene chloride selected from the group consisting of an alkyl acrylate and acrylonitrile and up to 1.6% by weight, based on the weight of the previous components, of an unsaturated aliphatic acid selected from the group consisting of acrylic acid, methacrylic acid and itaconic acid; and drying said coated film.

20. A process as in claim 19 wherein the base sheet is a film of regenerated cellulose.

References Cited in the file of this patent

UNITED STATES PATENTS

| | | |
|---|---|---|
| 2,160,943 | Britten et al. | June 6, 1939 |
| 2,479,241 | Kolvoort et al. | Aug. 16, 1949 |
| 2,614,092 | Reilly | Oct. 14, 1951 |
| 2,626,945 | Carlin | Jan. 27, 1953 |
| 2,636,027 | Coover et al. | Apr. 21, 1953 |
| 2,711,996 | Hofrichter | June 28, 1955 |
| 2,762,720 | Michel | Sept. 11, 1956 |
| 2,773,052 | Cohen et al. | Dec. 4, 1956 |
| 2,787,561 | Sanders | Apr. 2, 1957 |
| 2,829,069 | Michel | Apr. 1, 1958 |

FOREIGN PATENTS

| | | |
|---|---|---|
| 654,342 | Great Britain | June 13, 1951 |
| 665,479 | Great Britain | Jan. 23, 1952 |